United States Patent [19]

Paul

[11] 4,445,237

[45] May 1, 1984

[54] CLOSE COUPLED WATER-CLOSET COMBINATION AND ADAPTER

[75] Inventor: Robert M. Paul, Ambler, Pa.

[73] Assignee: Partnership of Robert M. Paul, Amber, Pa.

[21] Appl. No.: 413,049

[22] Filed: Aug. 30, 1982

[51] Int. Cl.³ ............................................. E03D 11/00
[52] U.S. Cl. ............................................. 4/417; 4/419; 285/368; 285/211
[58] Field of Search .................. 4/417, 418, 419, 661, 4/398; 285/368, 211

[56] References Cited

U.S. PATENT DOCUMENTS

| | | | |
|---|---|---|---|
| 1,041,905 | 10/1912 | Tong | 285/368 |
| 1,202,502 | 10/1916 | Forth | 285/353 X |
| 2,096,306 | 10/1937 | Pieslak | 4/417 |
| 2,108,625 | 2/1938 | Tilden | 4/417 |
| 2,590,471 | 3/1952 | Smith | 285/368 X |
| 2,659,088 | 11/1953 | Smith | 4/419 |
| 2,700,774 | 2/1955 | Smith | 285/211 |
| 2,721,332 | 10/1955 | Smith | 4/419 |
| 2,743,460 | 5/1956 | Youngstrom et al. | 4/417 |
| 2,838,764 | 6/1958 | Smith | 4/417 |
| 2,971,202 | 2/1961 | Brewington | 4/417 X |
| 2,986,744 | 6/1961 | Schmitt et al. | 4/417 X |
| 2,996,728 | 8/1961 | Minella | 4/419 |
| 3,107,747 | 10/1963 | Parkinson | 181/36 |
| 3,142,845 | 8/1964 | Fulton | 4/417 |
| 3,267,491 | 8/1966 | Snyder et al. | 4/417 X |
| 3,448,466 | 6/1969 | Haldopoulos | 4/417 |
| 4,209,177 | 6/1980 | Hall | 285/368 |

FOREIGN PATENT DOCUMENTS 922817 4/1963 United Kingdom ............ 4/417

Primary Examiner—Henry K. Artis
Attorney, Agent, or Firm—Panitch, Schwarze, Jacobs & Nadel

[57] ABSTRACT

This invention relates to an adapter for coupling a toilet bowl, such as residential toilet bowl, to a flush device that is generally utilized in a commercial close coupled water-closet combination. The adapter includes a substrate having a hole therethrough, fasteners on opposite sides of the hole for attaching the substrate to a toilet bowl, a hollow fitting extending through the hole and attached to the substrate and extending both above and below the substrate and a rigidly flexible gasket frictionally attached to the fitting below the bottom surface of the substrate. The fitting has threads on the outer surface thereof for at least that portion of the fitting that extends above the substrate. The fitting has a flared circumference on that portion of its surface below the substrate. The flexible gasket is attached to the flared circumference below the substrate to form an extension of the fitting.

11 Claims, 4 Drawing Figures

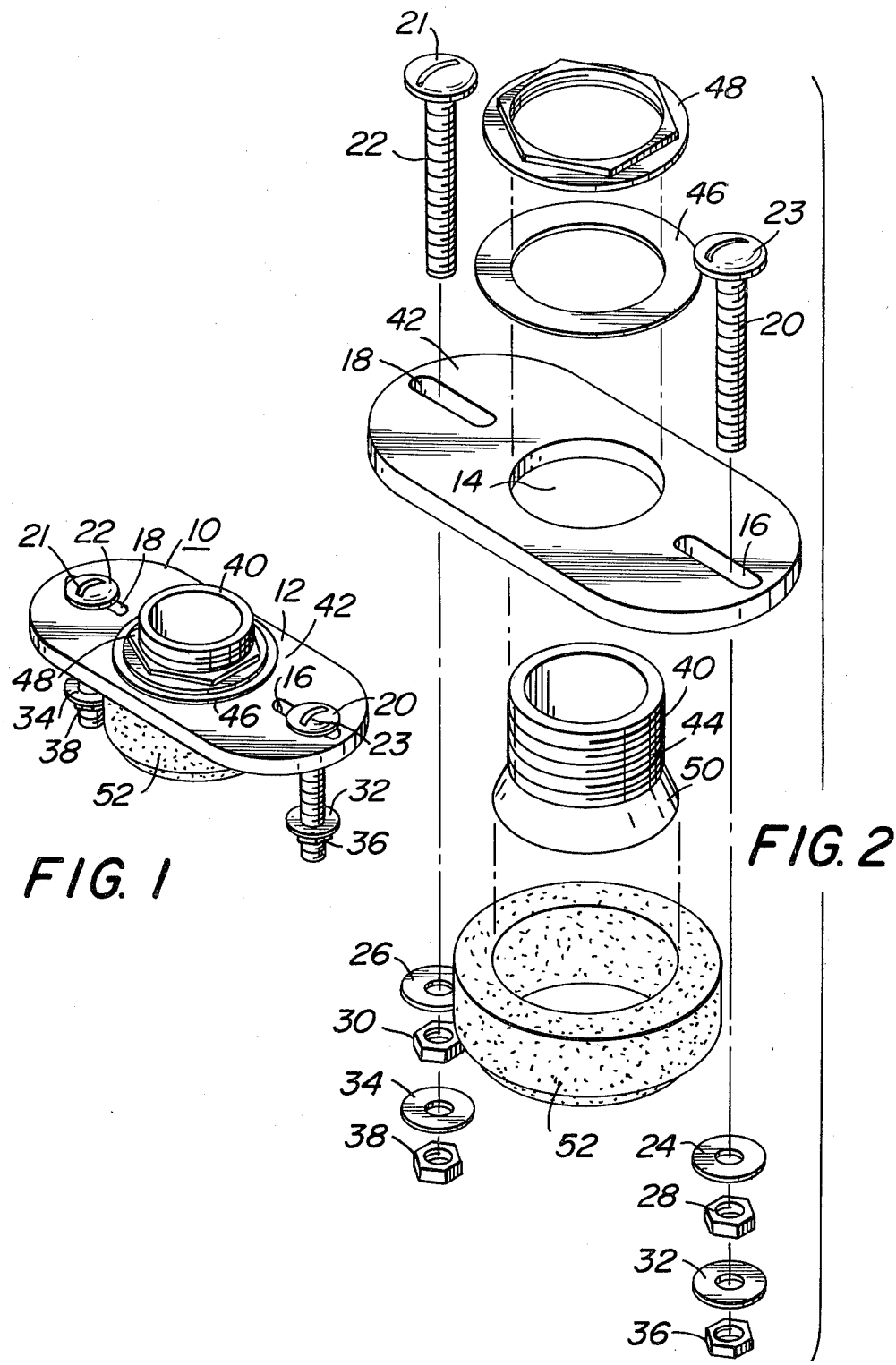

CLOSE COUPLED WATER-CLOSET COMBINATION AND ADAPTER

BACKGROUND OF THE INVENTION

The present invention concerns a close coupled water-closet combination. More particularly, this invention relates to an adapter to couple a toilet bowl to a flush device.

Close coupled water-closet combinations encompass toilet bowls affixed to either water tanks or flush devices. Generally, toilet bowls are made either for commercial or residential use. Residential toilets generally comprise a tank which has a fitting which communicates with the toilet bowl. Commercial toilets generally have a flush device in lieu of a water holding tank and employ a different fitting than residential toilets for connecting the flush device to the toilet bowl.

Toilet bowls are generally made from porcelain and are formed with different configurations depending on whether they are intended for use in a commercial or residential setting.

After a toilet bowl is connected to either a tank or flush device, it may happen that one of the parts may become damaged and it would become necessary, or desirable, that the damaged part be replaced. Since styles and details of construction of such plumbing fixtures are frequently changed, and if the original plumbing combination has been in use for a long time, it may be difficult, or impossible to obtain a duplicate replacement. Accordingly, a replacement part of a different make or size, or one having different details of construction would have to be utilized.

The holes in substitute or replacement parts for accommodating the anchor bolts for connecting toilet bowls with tanks or flush devices may be differently spaced in relation to the spacing of the holes of the complimental part, and accordingly a proper connection would not be able to be made.

A further problem arises, when one wishes to employ a commercial flush device with a toilet bowl adapted for residential use (one originally intended for use in conjunction with a toilet tank).

U.S. Pat. No. 2,743,460 concerns an adjustable connector to combine a tank and bowl of a close coupled water-closet combination. The connector consists of a pair of plates each with a hole in its inner end portion through which a nipple extends. Anchor bolts 26 pass through slotted openings 25.

U.S. Pat. No. 2,108,625 concerns a connector for coupling a toilet bowl to a toilet tank wherein the connecting member 30 (or 50 or 74) is thread connected to a shank (20).

U.S. Pat. No. 2,700,774 concerns a combined metal ring and rubber gasket for use in close coupled water-closet combinations. The metal ring has an interiorly threaded tubular portion which is screwed onto a spud. The ring also has a flange which projects outward and which engages the toilet tank. A gasket surrounds the tubular member and engages the toilet bowl.

U.S. Pat. No. 3,107,747 relates to close coupled water-closet tank fittings with silencing means.

Other United States patents showing combined closet bowl and tank assemblies with means of attaching bowls to tanks include U.S. Pat. Nos. 2,096,306; 2,590,471; 2,659,088; 2,971,202; 2,986,744; 3,142,845 and 3,267,491.

A device for attaching a flushing cistern to a water-closet pedestal is described in British Pat. Specification No. 922,817.

In view of the above, there is a need for an adapter device to connect various designs of toilet bowls to either flush devices or toilet tanks. The present invention satisfies this need.

SUMMARY OF THE INVENTION

This invention concerns a close coupled water-closet combination. This combination includes a source of water under pressure and a conduit connected at one end to the source of water. The conduit contains a time control valve for controlling the flow of water through the conduit. An adapter is coupled to the other end of the conduit and serves to couple the conduit to a toilet bowl. The adapter includes a substrate having a hole therethrough, fasteners on opposite sides of the hole for attaching the substrate to a toilet bowl, a hollow fitting extending through the hole and attached to the substrate and extending both above and below the substrate and a hollow, rigidly flexible gasket frictionally attached at one end thereof to the fitting circumference below the substrate. The fitting has threads on its outer surface thereof for at least that portion of the surface of the fitting above the substrate. The outer end of the conduit is connected to the fitting. That portion of the fitting below the substrate has a flared circumference and the gasket forms an extension of the fitting. The gasket abuts an opening in the toilet bowl to allow water to pass from the source of water under pressure to the toilet bowl.

This invention also relates to an adapter that serves to couple a toilet bowl to a flush device. The adapter comprises a substrate having a hole therethrough, fasteners on opposite sides of the hole for attaching the substrate to a toilet bowl, a hollow fitting extending through the hole and attached to the substrate and extending both above and below the substrate and a hollow, rigidly flexible gasket. The fitting has threads on the outer surface thereof for at least that portion of the fitting's surface that extends above the substrate. The fitting has a flared circumference on that portion of its surface below the substrate. The flexible gasket is frictionally attached at the upper end thereof to the fitting circumference below the substrate to form an extension of the fitting.

BRIEF DESCRIPTION OF THE DRAWINGS

For the purpose of illustrating the invention, there is provided in the drawings forms which are presently preferred; it being understood, however, that this invention is not limited to the precise arrangements and instrumentalities shown.

FIG. 1 is a perspective view of an adapter in accordance with this invention.

FIG. 2 is an exploded isometric view of the adapter shown in FIG. 1.

DETAIL DESCRIPTION OF THE INVENTION

Figure 4:
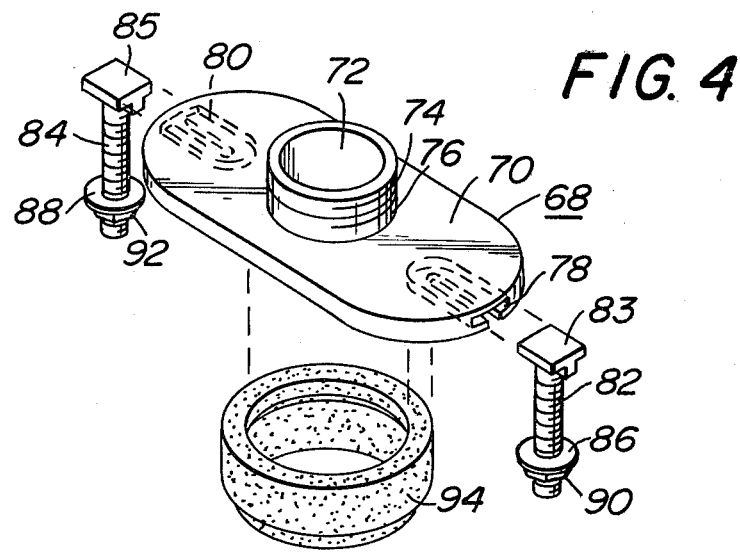
FIG. 4 is a perspective view of another embodiment of an adapter in accordance with the present invention.

Referring to the drawings in detail, wherein like numerals indicate like elements, there is shown in FIGS. 1 and 2 an adapter 10 in accordance with this invention.

The adapter 10 has a substrate 12 with a hole 14 therethrough. The substrate 12 can be constructed from any suitable material such as, for example, metal, plastic, ceramic, porcelain, etc. It is preferred that the hole 14 be located approximately in the center of the substrate 12.

On opposite sides of the hole 14 are slotted channels 16 and 18 for accommodating bolts 20, 22, with screw threads on the outer surfaces thereof. The fasteners 20, 22 pass respectively through slotted channels 16, 18. The slotted channels 16, 18 allow the bolts to be aligned with various toilet bowls having different locations for the apertures that receive the bolts 20, 22.

The bolts 20, 22 are fastened in place against the bottom surface of the substrate 12 by means of washers 24, 26 and nuts 28, 30. Washers 32, 34 and nuts 36, 38 are utilized to fasten the substrate 12 to a toilet bowl (not shown).

A hollow fitting 40 passes through the hole 14 in substrate 12. The hollow fitting 40 is attached to the top surface 42 of substrate 12 by means of a washer 46 and a lock nut 48 which is screw thread connected to the threads 44 on the outside surface of hollow fitting 40. The fitting 40 has a flared circumference 50 on its bottom end thereof which abuts against the bottom surface of the substrate 12 when the fitting 40 is fastened in place. A rigidly flexible gasket 52 is frictionally attached at its upper end thereof to the flared circumference 50 of hollow fitting 40 and forms an extension of the fitting 40. The gasket 52 is made of a suitable material such as, for example, rubber. The gasket 52 faces the toilet bowl and serves as a spacer, an axial extension of fitting 40 and a seal. The lower end of gasket 52 is tapered inwardly on the outer periphery thereof.

Figure 3:
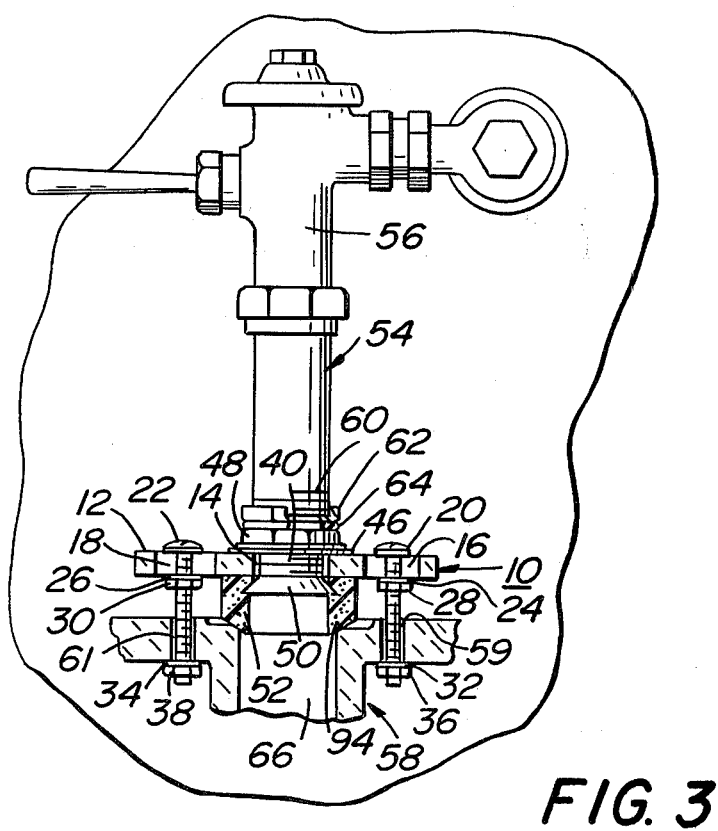
FIG. 3 is an elevational view, partially in section, showing the adapter of FIGS. 1 and 2 connecting a flush device to a toilet bowl.

As shown in FIG. 3, the adapter 10 serves to connect a flush device 54 including time controlled valve 56 to a toilet bowl 58, such as a residential toilet bowl. The flush device 54 has screw threads 60 on the outer surface thereof where the flush device 54 is to be connected to toilet bowl 58. A threaded nut 62 is screw thread connected to screw threads 60. The flush device 54 is held in place on the adapter 10 by means of nut 62 and a compression ring 64 which is disposed between nut 62 and lock nut 48 on the adapter 10. The compression ring 64 is fabricated from a suitable material such as, for example, rubber. Bolts 20, 22 pass through apertures 59, 61 in toilet bowl 58. Washer-nut combinations 32, 36 and 34, 38 respectively, on bolts 20 and 22, connect the adapter 10 to the toilet bowl 58. The gasket 52 has a taper on its lower end which forms a seal with water conduit 66 of the toilet bowl 58.

Another embodiment of an adapter according to the present invention is shown in FIG. 4. The adapter 68 has a generally flat section 70 with a hole 72 therethrough. It is preferred that the hole 72 be located approximately in the center of section 70.

Surrounding the hole 72 is a hollow upright member 74 which is integrally formed with the flat section 70. On the outer surface of the upright member 74 are screw threads 76.

On opposite sides of the hole 72 are slotted channels 78, 80 for accommodating bolts 82, 84 which respectively slip into channels 78, 80 at opposite sides of section 70. The bolts 82, 84 have screw threads on the outer surfaces thereof. Washers 86, 88 and nuts 90, 92 are respectively attached to bolts 82, 84 for fastening the adapter 68 to a toilet bowl (not shown). In comparison to bolts 20, 22 as depicted in FIGS. 1 and 2 which have exposed top heads 21, 23, bolts 82, 84 have top heads 83, 85 which are not visible when the bolts are inserted in section 70. Bolts 82, 84 are thus tamperproof.

The upright member 74 extends through hole 72 and terminates in a flared section on the bottom surface of the flat section 70 in a manner similar to item 50 depicted in FIG. 2 (this feature is not depicted in FIG. 4). A rigidly flexible gasket 94 frictionally attaches at its upper end thereof to the aforesaid flared section of member 74 so as to form an extension of member 74. The gasket 94 is made of a suitable material such as, for example, rubber. The gasket 94 faces the toilet bowl (not shown) and serves as a spacer, an axial extension of member 74 and a seal. The lower end of gasket 94 is tapered inwardly on the outer periphery thereof.

The adapter 68 is made of any suitable material. It is preferred that the adapter 68 be produced from a molded plastic.

The present invention may be embodied in other specific forms without departing from the spirit or essential attributes thereof, and accordingly, reference should be made to the appended claims, rather than to the foregoing specification, as indicating the scope of the invention.

I claim:

1. A close coupled water-closet combination comprising:
    a source of water under pressure,
    a conduit connected at one end to said source, said conduit containing a time controlled valve for controlling the flow of water through said conduit, and
    an adapter coupled to the other end of said conduit for coupling said conduit to a toilet bowl, said adapter including:
    (a) a substrate having a hole therethrough;
    (b) fasteners on opposite sides of the hole for attaching said substrate to said toilet bowl;
    (c) a hollow fitting extending through the hole and attached to said substrate and extending both above and below the substrate, said fitting having threads on the outer surface thereof for at least that portion of said surface above said substrate, said other end of said conduit being connected to said fitting, said fitting below said substrate having a flared circumference; and
    (d) a hollow, flexible gasket frictionally attached to said fitting circumference, said gasket forming an extension of said fitting, said gasket abuts an opening in the toilet bowl to allow water to pass from said source of water under pressure to said toilet bowl.

2. A close coupled water-closet combination in accordance with claim 1 wherein said gasket is made from rubber.

3. A close coupled water-closet combination in accordance with claim 1 wherein said gasket is tapered inwardly on its outer periphery at the lower end of the gasket.

4. A close coupled water-closet combination in accordance with claim 1 wherein said toilet bowl is a residential toilet bowl.

5. A close coupled water-closet combination in accordance with claim 1 wherein said substrate and said fitting form a single integral piece.

6. An adapter to couple a toilet bowl to a flush device comprising:
    (a) a substrate having a hole therethrough;

(b) fasteners on opposite sides of said hole for attaching said substrate to a toilet bowl;
(c) a hollow fitting extending through the hole and attached to said substrate and extending both above and below the substrate, said fitting having a flared circumference for that portion of said fitting disposed below said substrate; and
(d) a hollow, flexible gasket frictionally attached at the upper end thereof to said fitting circumference below said substrate to form an extension of said fitting.

7. An adapter in accordance with claim 6 wherein said gasket is made of rubber.

8. An adapter in accordance with claim 6 wherein the outer periphery of the gasket is tapered inwardly at the lower end of the gasket.

9. An adapter in accordance with claim 6 wherein said fasteners pass through a slotted channel in said substrate.

10. An adapter in accordance with claim 6 wherein said substrate and fitting form a single integral piece.

11. An adapter in accordance with claim 6 wherein said substrate has slotted channels such as to allow said fasteners to slip into said channels at opposite ends of said substrate.

* * * * *